US009704467B1

(12) United States Patent
Nampy

(10) Patent No.: US 9,704,467 B1
(45) Date of Patent: Jul. 11, 2017

(54) ACOUSTIC PANEL WITH CORRUGATED BAFFLES AND SEPTUMS

(71) Applicant: Rohr, Inc., Chula Vista, CA (US)

(72) Inventor: Sreenivas Narayanan Nampy, San Diego, CA (US)

(73) Assignee: Rohr, Inc., Chula Vista, CA (US)

(*) Notice: Subject to any disclaimer, the term of this patent is extended or adjusted under 35 U.S.C. 154(b) by 0 days.

(21) Appl. No.: 15/130,398

(22) Filed: Apr. 15, 2016

(51) Int. Cl.
| | |
|---|---|
| *G10K 11/168* | (2006.01) |
| *G10K 11/172* | (2006.01) |
| *B64C 1/40* | (2006.01) |
| *F02C 7/24* | (2006.01) |
| *G10K 11/16* | (2006.01) |
| *B64C 1/00* | (2006.01) |
| *B64D 33/02* | (2006.01) |
| *F02K 1/34* | (2006.01) |

(52) U.S. Cl.
CPC .............. *G10K 11/168* (2013.01); *F02C 7/24* (2013.01); *B64D 33/02* (2013.01); *B64D 33/06* (2013.01); *B64D 2033/0206* (2013.01)

(58) Field of Classification Search
CPC .... G10K 11/168; G10K 11/172; F02K 1/827; F02K 1/82; B64D 29/00; B64D 33/02; B64D 33/06; B64D 2033/0206
USPC ................................. 181/292, 288, 214, 213
See application file for complete search history.

(56) References Cited

U.S. PATENT DOCUMENTS

| | | | | |
|---|---|---|---|---|
| 2,333,343 A | * | 11/1943 | Sendzimir .............. | B21D 53/00 156/197 |
| 3,011,602 A | * | 12/1961 | Ensrud ...................... | E04C 2/32 244/123.12 |
| 3,341,395 A | * | 9/1967 | Weber ................... | E04C 2/3405 428/134 |
| 3,380,206 A | * | 4/1968 | Barnett ................... | E04B 9/001 181/292 |
| 3,507,355 A | * | 4/1970 | Lawson .................... | E04B 1/86 181/292 |
| 3,542,152 A | * | 11/1970 | Oxx, Jr. ................. | B64D 33/02 181/214 |
| 3,639,106 A | | 2/1972 | Yate | |
| 3,640,357 A | * | 2/1972 | Kitching ................... | F01N 1/24 181/292 |

(Continued)

FOREIGN PATENT DOCUMENTS

| | | |
|---|---|---|
| CN | 101649818 | 7/2011 |
| CN | 104723616 | 6/2015 |

(Continued)

*Primary Examiner* — Edgardo San Martin
(74) *Attorney, Agent, or Firm* — O'Shea Getz P.C.

(57) ABSTRACT

A panel for attenuating noise includes a core, which forms a plurality of cavities vertically between a perforated first skin and a second skin. The core includes an array of corrugations that include a first baffle, a second baffle and a first septum. The cavities include a first cavity that is formed longitudinally between the first baffle and the second baffle and is fluidly coupled with perforations in the first skin. The first septum extends from the first skin and the first baffle to the second skin and the second baffle, and divides the first cavity into fluidly coupled sub-cavities. The first baffle includes a lateral array of baffle ribs. The first septum includes a lateral array of septum ribs that are laterally offset from the baffle ribs.

20 Claims, 14 Drawing Sheets

(56) References Cited

U.S. PATENT DOCUMENTS

| | | | | |
|---|---|---|---|---|
| 3,734,234 A | * | 5/1973 | Wirt | E04B 1/86 181/286 |
| 3,819,007 A | * | 6/1974 | Wirt | E04B 1/86 181/286 |
| 3,831,710 A | * | 8/1974 | Wirt | G10K 11/172 181/286 |
| 3,848,697 A | * | 11/1974 | Jannot | F02K 1/827 181/220 |
| 3,969,563 A | * | 7/1976 | Hollis, Sr. | B32B 3/28 220/62.11 |
| 4,859,517 A | * | 8/1989 | Hull | B32B 3/12 156/292 |
| 5,431,980 A | * | 7/1995 | McCarthy | B31D 3/023 428/116 |
| 5,635,306 A | * | 6/1997 | Minamida | B21D 47/00 228/181 |
| 6,725,541 B1 | * | 4/2004 | Holme | F02K 1/54 29/889.2 |
| 6,871,725 B2 | | 3/2005 | Johnson | |
| 6,949,282 B2 | * | 9/2005 | Obeshaw | B21C 37/15 138/119 |
| 7,814,658 B2 | | 10/2010 | Akishev et al. | |
| 8,413,922 B2 | | 4/2013 | Porte et al. | |
| 8,517,309 B2 | | 8/2013 | Robinson | |
| 8,733,501 B2 | | 5/2014 | Porte et al. | |
| 8,763,751 B2 | * | 7/2014 | Starobinski | B64D 33/06 181/213 |
| 8,955,643 B2 | * | 2/2015 | Liu | F02C 7/045 181/213 |
| 2011/0100747 A1 | | 5/2011 | Hoetzeldt et al. | |
| 2013/0266772 A1 | | 10/2013 | Fujii | |
| 2014/0349082 A1 | | 11/2014 | Tien | |
| 2015/0110603 A1 | | 4/2015 | Biset et al. | |
| 2015/0284945 A1 | | 10/2015 | Tien | |

FOREIGN PATENT DOCUMENTS

| | | |
|---|---|---|
| GB | 1406844 | 9/1975 |
| RU | 2413654 | 6/2010 |

* cited by examiner

ACOUSTIC PANEL WITH CORRUGATED BAFFLES AND SEPTUMS

BACKGROUND OF THE INVENTION

1. Technical Field

This disclosure relates generally to noise attenuation and, more particularly, to an acoustic panel for attenuating noise generated by, for example, a gas turbine engine for an aircraft propulsion system.

2. Background Information

Acoustic panels may be used in various applications to attenuate noise. An acoustic panel, for example, may be configured with a nacelle of an aircraft propulsion system to attenuate noise generated by a gas turbine engine. Such an acoustic panel typically includes a honeycomb core connected between a perforated face skin and a solid, non-perforated back skin. The honeycomb core includes a plurality of resonating chambers. These resonating chambers are tuned by selecting a desired chamber length and, thus, core thickness that corresponds to a specific target frequency of noise to be attenuated. Increasing the core thickness, for example, will typically tune the resonating chambers for attenuating lower frequency noise. Conversely, decreasing the core thickness will typically tune the resonating chambers for attenuating higher frequency noise.

Recent trends in aircraft engine design such as higher bypass ratios, larger fan diameters, slower rotating fans and/or fewer number of fan blades have resulted in those aircraft engines generating relatively low frequency noise. Relatively strict space constraints for those engines, however, typically limit or prohibit increasing the thickness of an acoustic panel to tune its resonating chambers for such relatively low frequency noise. There is a need in the art therefore for an acoustic panel operable to attenuate relatively low frequency noise while utilizing the same or less space than previous acoustic panels. There is a further need to provide such a panel with the same or more structural integrity than previous acoustic panels.

SUMMARY OF THE DISCLOSURE

According to an aspect of the present disclosure, a panel is provided for attenuating noise. This panel includes a perforated first skin, a second skin and a core, which forms a plurality of cavities vertically between the first skin and the second skin. The core includes an array of corrugations that include a first baffle, a second baffle and a first septum. The cavities include a first cavity that is formed longitudinally between the first baffle and the second baffle and is fluidly coupled with perforations in the first skin. The first septum extends from the first skin and the first baffle to the second skin and the second baffle, and divides the first cavity into fluidly coupled sub-cavities. The first baffle includes a lateral array of baffle ribs. The first septum includes a lateral array of septum ribs that are laterally offset from the baffle ribs.

According to another aspect of the present disclosure, another panel is provided for attenuating noise. This panel includes a perforated first skin, a second skin and a core, which forms a plurality of cavities vertically between the first skin and the second skin. The core includes an array of corrugations that include a first baffle, a second baffle and a first septum. The cavities include a first cavity that is formed longitudinally between the first baffle and the second baffle and is fluidly coupled with perforations in the first skin. The first septum extends from the first skin and the first baffle to the second skin and the second baffle, and divides the first cavity into fluidly coupled sub-cavities. The first baffle includes a lateral array of baffle ribs that extend along an entire length of the first baffle between the first skin and the second skin. The first septum includes a lateral array of septum ribs that extend along an entire length of the first septum between the first skin and the second skin.

According to still another aspect of the present disclosure, another panel is provided for attenuating noise. This panel includes a perforated first skin, a second skin and a core, which forms a plurality of cavities vertically between the first skin and the second skin. The core includes a plurality of baffles and a plurality of septums respectively interposed between the baffles thereby forming an array of corrugations. The baffles include a first baffle and a second baffle. The septums include a first septum. The cavities include a first cavity formed longitudinally between the first baffle and the second baffle. The first septum longitudinally divides the first cavity into fluidly coupled sub-cavities. A first end of the first septum is connected to the first skin and the first baffle. A second end of the first septum is connected to the second skin and the second baffle. Each of the baffles includes a lateral array of baffle ribs. Each of the septums includes a lateral array of septum ribs. The baffle ribs are configured with the baffles and the septum ribs are configured with the septums to enable draping of the core about a laterally extending axis.

The septum ribs may be laterally offset from the baffle ribs.

A first of the septum ribs may be laterally aligned with a groove portion formed in the first baffle between a laterally adjacent pair of the baffle ribs.

The baffle ribs and the septum ribs may extend to an interface between the first baffle and the first septum thereby providing the interface with an undulating geometry. The first baffle and the first septum may be connected to the first skin at the interface.

The first septum may include a plurality of groove portions. Each of the groove portions may be formed between a respective laterally adjacent pair of the septum ribs. The first septum may include plurality of perforations in the groove portions and the septum ribs.

A first of the septum ribs may be disposed laterally between a laterally adjacent pair of the baffle ribs.

A first of the septum ribs may be laterally aligned with a groove portion formed in the first baffle between a laterally adjacent pair of the baffle ribs.

The baffle ribs and the septum ribs may extend to an interface between the first baffle and the first septum thereby providing the interface with an undulating geometry. The first baffle and the first septum may be connected to the first skin at the interface.

The interface may include a plurality of apertures respectively between adjacent peaks of the undulating geometry.

The corrugations may be configured to enable draping of the core about a laterally extending axis.

The baffle ribs may extend along an entire length of the first baffle between the first skin and the second skin. The septum ribs may extend along an entire length of the first septum between the first skin and the second skin.

The first septum may include a plurality of perforations in the septum ribs.

The first septum may include a plurality of groove portions. Each of the groove portions may be formed between a respective laterally adjacent pair of the septum ribs. The first septum may include a plurality of perforations in the groove portions.

The first baffle and the first septum may have corrugated configurations.

Each of the baffle ribs may have a trapezoidal cross-sectional geometry. In addition or alternatively, each of the septum ribs may have a trapezoidal cross-sectional geometry.

The first baffle may be offset from the first skin by an acute first angle. The first septum may be offset from the first skin by a second angle.

The second angle may be substantially equal to or different than the first angle.

The panel may be configured as a component of an aircraft propulsion system.

The array of corrugations may be a first array of corrugations. The core may further include a second array of corrugations. Peaks of the first array of corrugations may be longitudinally offset from peaks of the second array of corrugations.

The array of corrugations may be a first array of corrugations. The core may further include a second array of corrugations. Orientations of the first array of corrugations and the second array of corrugations may alternate with one another.

The foregoing features and the operation of the invention will become more apparent in light of the following description and the accompanying drawings.

DETAILED DESCRIPTION OF THE INVENTION

Figure 1:
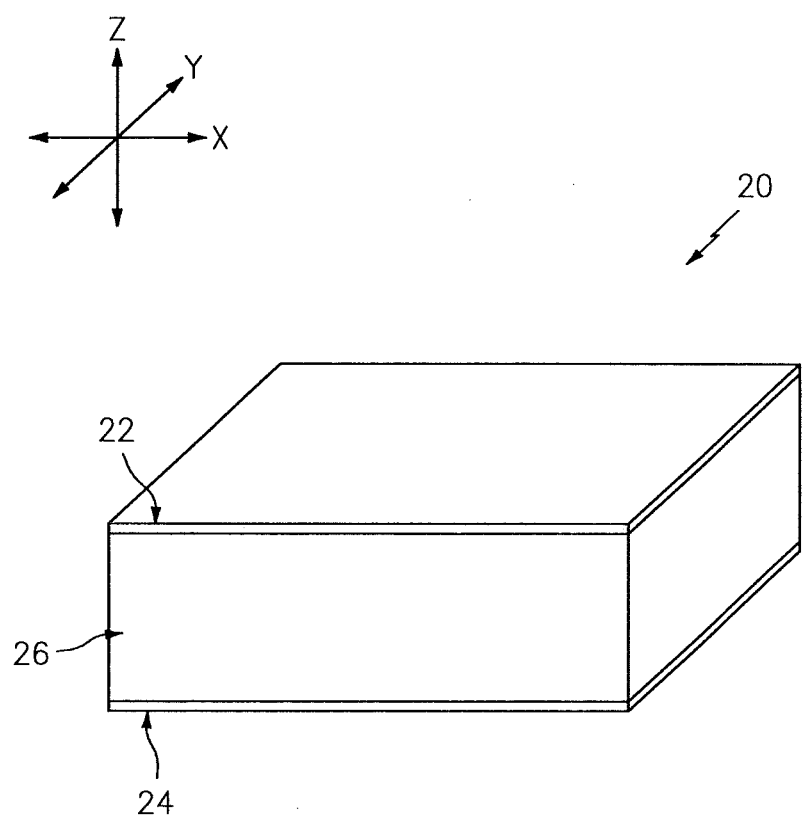
FIG. 1 is a partial, perspective block diagram illustration of a structural, acoustic panel for attenuating noise.

FIG. 1 is a partial, perspective block diagram illustration of a structural, acoustic panel 20 for attenuating noise. This acoustic panel 20 may be configured to attenuate noise generated by an aircraft propulsion system such as, for example, a turbofan propulsion system or a turbojet propulsion system. With such a configuration, the acoustic panel 20 may be configured with a nacelle of the propulsion system. The acoustic panel 20, for example, may be configured as or with an inner or outer barrel, a translating sleeve of a thrust reverser, a blocker door, etc. Alternatively, the acoustic panel 20 may be configured with another component/structure of the aircraft such as its fuselage or a wing. Furthermore, the acoustic panel 20 may be configured to also or alternatively attenuate aircraft related noise other than that generated by the propulsion system. The acoustic panel 20 of the present disclosure, however, may alternatively be configured for non-aircraft applications.

The acoustic panel 20 extends longitudinally along an x-axis. The acoustic panel 20 extends laterally along a y-axis. The acoustic panel 20 extends vertically along a z-axis. The term "vertical" is used herein to describe a depthwise panel direction and is not limited to a gravitational up/down direction. Furthermore, for ease of illustration, the x-y plane is shown as a generally flat plane. However, in other embodiments, the x-y plane and, thus, the acoustic panel 20 may be curved and/or follow an undulating geometry. For example, the x-y plane and, thus, the acoustic panel 20 may be arcuate, cylindrical or conical with or without radial undulations. Thus, the vertical direction may change at different locations along the x-y plane; e.g., the vertical direction may be a radial direction for a cylindrical or conical acoustic panel.

The acoustic panel 20 includes a perforated first (e.g., face) skin 22, a solid, non-perforated second (e.g., back) skin 24 and a cellular core 26. Briefly, the cellular core 26 is disposed and extends vertically between the first skin 22 and the second skin 24. The cellular core 26 is also connected to the first skin 22 and the second skin 24. The cellular core 26, for example, may be welded, brazed, fused, adhered and/or otherwise bonded to the first skin 22 and/or the second skin 24. The cellular core 26 may also or alternatively be mechanically fastened to the first skin 22 and/or the second skin 24. Alternatively, the cellular core 26 may be formed integral with the first skin 22 and/or the second skin 24 as a monolithic body using, for example, additive manufacturing. However, the present disclosure is not limited to any particular manufacturing methods.

Figure 2:
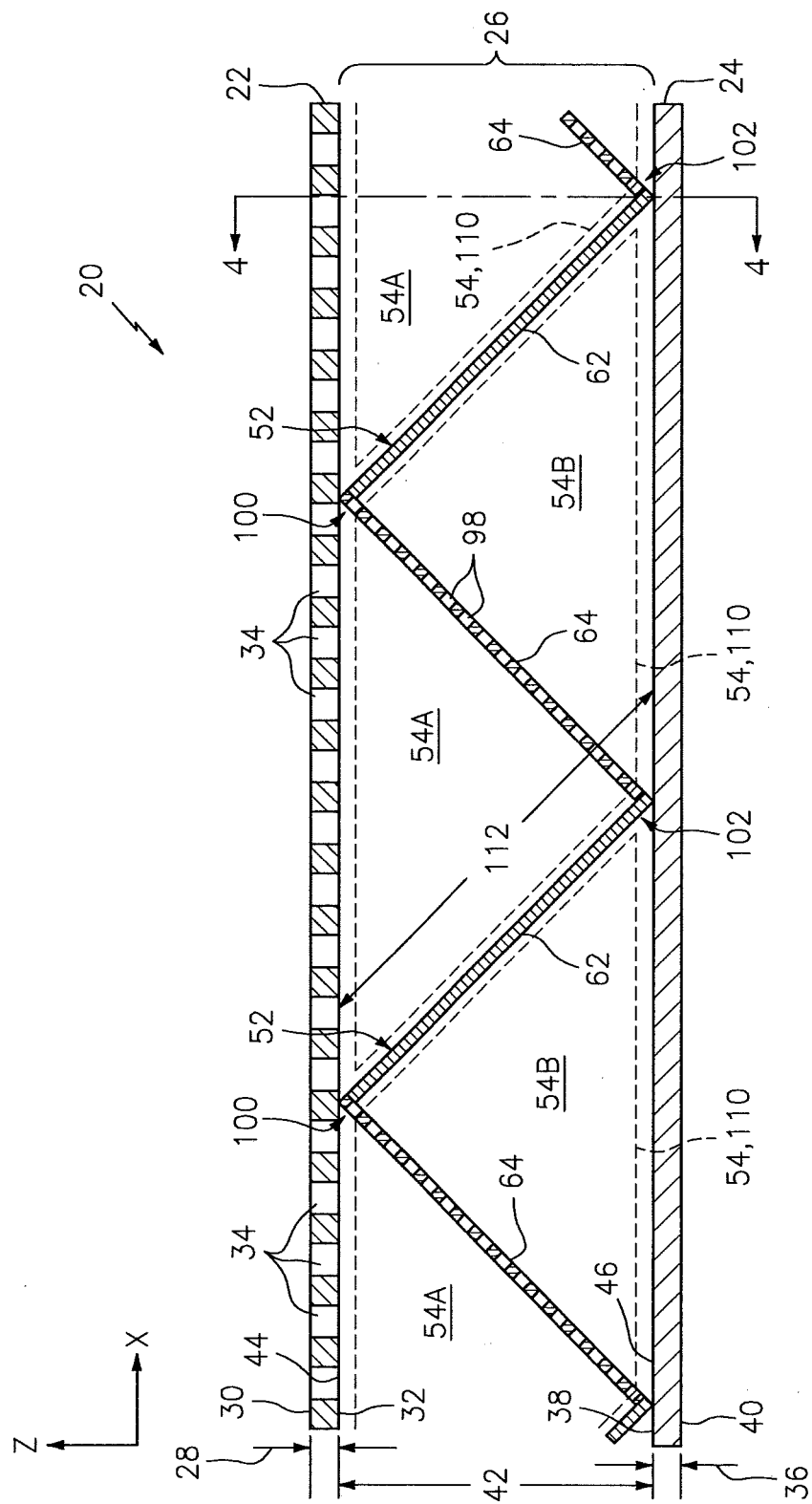
FIG. 2 is a sectional illustration of a portion of the acoustic panel taken in an x-z plane.

The first skin 22 may be configured as a relatively thin sheet or layer of material that extends longitudinally and laterally along the x-y plane. This first skin 22 material may include, but is not limited to, a metal, a polymer, a fiber reinforced composite (e.g., fiberglass composite, carbon fiber composite, aramid fiber composite, etc.), or a combination thereof. Referring now to FIG. 2, the first skin 22 has a vertical thickness 28, which extends vertically between opposing side surfaces 30 and 32. The first skin 22 includes a plurality of perforations 34; e.g., apertures such as through-holes. Each of these perforations 34 extends generally vertically through the first skin 22 between its side surfaces 30 and 32.

The second skin 24 may be configured as a relatively thin sheet or layer of (e.g., continuous and uninterrupted) material that extends longitudinally and laterally along the x-y plane (see FIG. 1). This second skin 24 material may include, but is not limited to, a metal, a polymer, a fiber reinforced composite (e.g., fiberglass composite, carbon fiber composite, aramid fiber composite, etc.), or a combination thereof. The second skin 24 material may be the same as or different than the first skin 22 material. The second skin 24 has a vertical thickness 36, which extends vertically between opposing side surfaces 38 and 40. This vertical thickness 36 may be substantially equal to or different (e.g., greater or less) than the vertical thickness 28 of the first skin 22.

Figure 3:
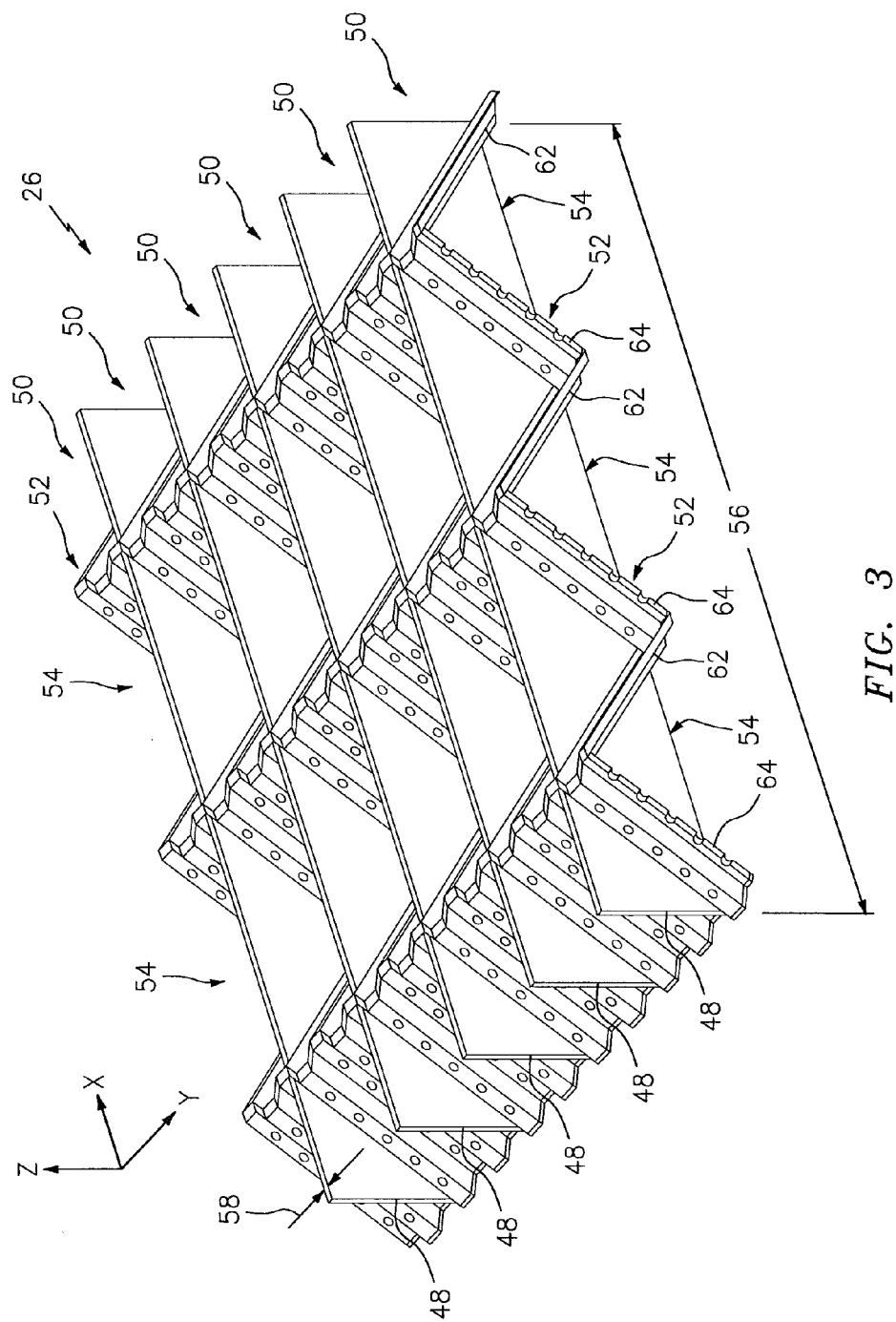
FIG. 3 is a perspective illustration of a portion of a cellular core for the acoustic panel.

Referring to FIG. 3, the cellular core 26 extends longitudinally and laterally along the x-y plane. Referring again to FIG. 2, the cellular core 26 has a vertical thickness 42, which extends vertically between opposing core sides 44 and 46 respectively abutted against the first skin 22 and the second skin 24. The vertical thickness 42 may be substantially greater than the vertical thickness 28, 36 of first skin 22 and/or the second skin 24. The vertical thickness 42, for example, may be at least ten to forty times (10-40×), or more, greater than the vertical thickness 28, 36; however, the acoustic panel 20 of the present disclosure is not limited to such an exemplary embodiment.

Figure 4:
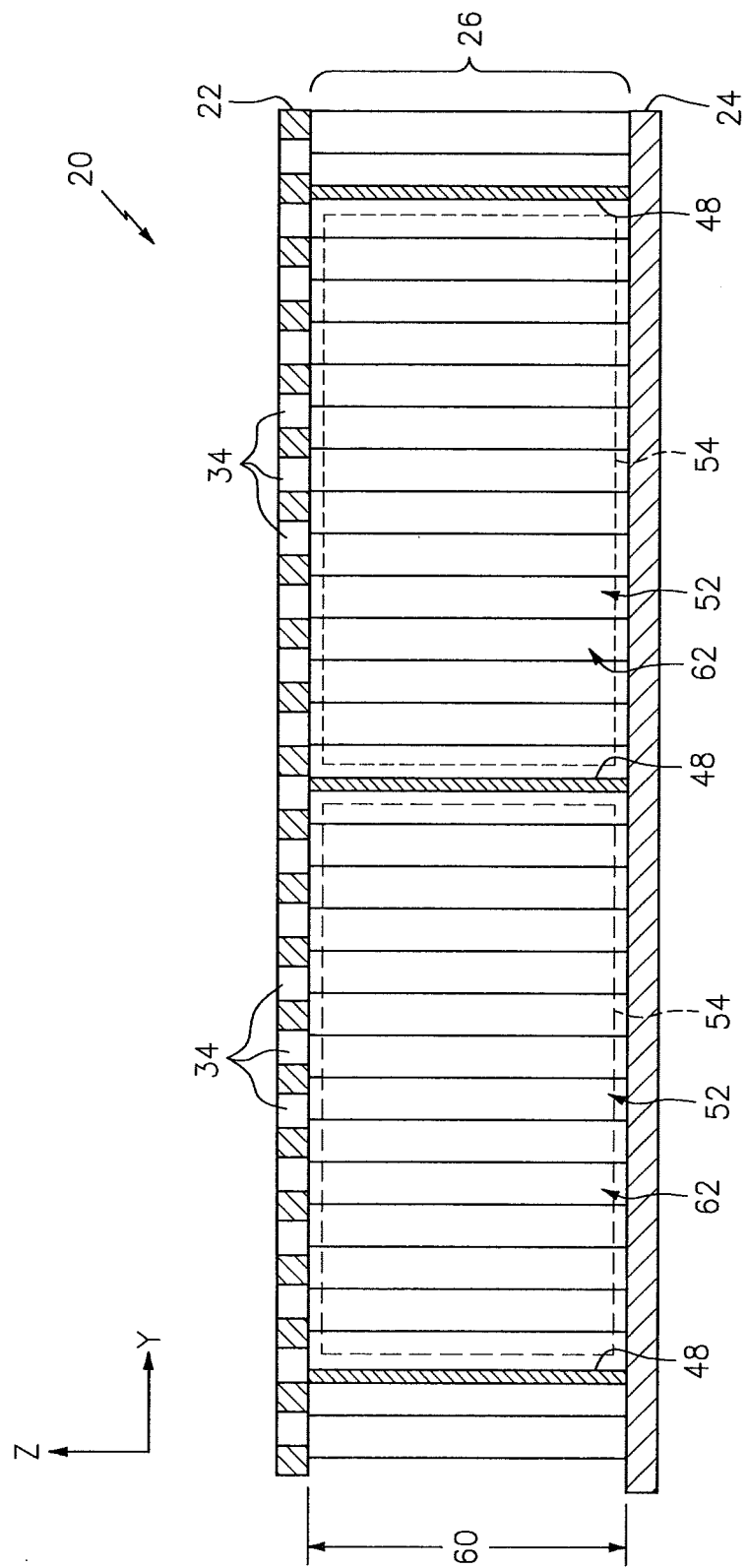
FIG. 4 is a sectional illustration of the acoustic panel portion of FIG. 2 taken in a y-z plane.

Referring to FIGS. 2-4, the cellular core 26 includes a plurality of walls 48 and one or more arrays 50 of corrugations 52. The walls 48 and corrugations 52 are arranged together to configure the cellular core 26 as an open cavity (e.g., open cell) structure. This open cavity structure forms a plurality of cavities 54 vertically between the first skin 22 and the second skin 24. Each of these cavities 54 may be fluidly coupled with one or more respective perforations 34 in the first skin 22 (see FIG. 2).

Referring to FIG. 3, each of the walls 48 has a length 56 that extends longitudinally along the x-axis. Each of the walls 48 has a thickness 58 that extends laterally along the y-axis. Referring now to FIG. 4, each of the walls 48 has a height 60 that extends vertically between the first skin 22 and the second skin 24.

Each of the walls 48 is connected to or otherwise engaged with the first skin 22 and/or the second skin 24. Each of the walls 48 of FIG. 4 is orientated substantially perpendicular to the first skin 22 and the second skin 24; e.g., at a ninety degree angle to the skins. However, in other embodiments, one or more of the walls 48 may be offset from the first skin 22 and/or the second skin 24 by a non-ninety degree angle; e.g., an acute included angle or an obtuse angle.

The walls 48 are arranged generally parallel with one another; see also FIG. 3. The walls 48 are laterally spaced from one another along the y-axis so as to respectively form the cavities 54 between the walls 48. Each of the walls 48 shown in FIG. 4 therefore respectively forms lateral sides of the cavities 54 on either side of the respective wall 48. Each of the walls 48 thereby also fluidly separates those cavities 54 on either side of the wall 48.

Referring to FIG. 3, the corrugations 52 in each array 50 are disposed and extend laterally between a laterally adjacent pair of the walls 48; see also FIG. 4. The corrugations 52 are configured to enable draping of the core 26 about a laterally extending axis as described below in further detail; e.g., see FIGS. 9 and 10. Each of the corrugations 52 includes a baffle 62 and a septum 64.

Figure 5:
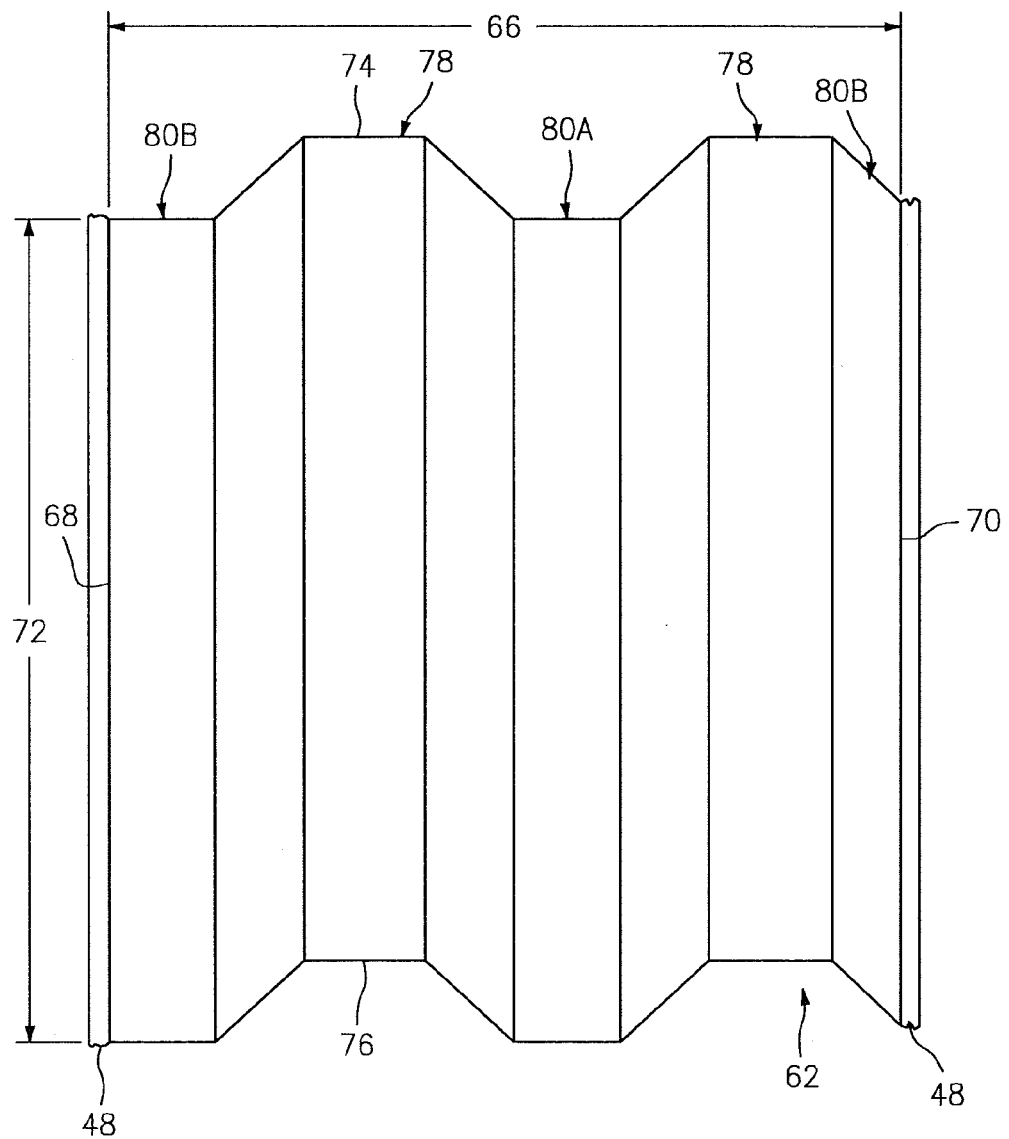
FIG. 5 is an illustration of a corrugated baffle.

Referring to FIG. 5, the baffle 62 has a width 66 extending between opposing lateral sides 68 and 70, which are connected to or otherwise engaged with respective walls 48. The baffle 62 has a length 72 extending vertically and longitudinally between opposing top and bottom ends 74 and 76; see also FIG. 8. Note, the terms "top" and "bottom" are used above to describe ends of the baffle 62 as situated in the drawings and are not intended to limit the baffle 62 or the acoustic panel 20 to such an exemplary gravitational orientation.

The baffle 62 is configured as a corrugated panel, which provides the baffle 62 with increased rigidity and stiffness compared to a flat planar panel. The baffle 62 of FIG. 5, in particular, includes a longitudinal array of baffle ribs 78 and a longitudinal array of baffle groove portions 80. Each of the baffle ribs 78 extends vertically and longitudinally between the top and the bottom ends 74 and 76 and, thus, along the entire length of the baffle 62.

The baffle groove portions 80 are longitudinally interposed with the baffle ribs 78. The baffle groove portions 80 include at least one intermediate baffle groove portion 80A. The baffle groove portions 80 of FIG. 5 also include one or more end baffle groove portions 80B. The intermediate baffle groove portion 80A is formed by and disposed laterally between a laterally adjacent pair of the baffle ribs 78. The intermediate baffle groove portion 80A therefore is a formed by a trough between peaks of the baffle ribs 78. Each of the end baffle groove portions 80B is formed by and disposed laterally between a respective one of the baffle ribs 78 and an adjacent one of the walls 48.

Figure 6:
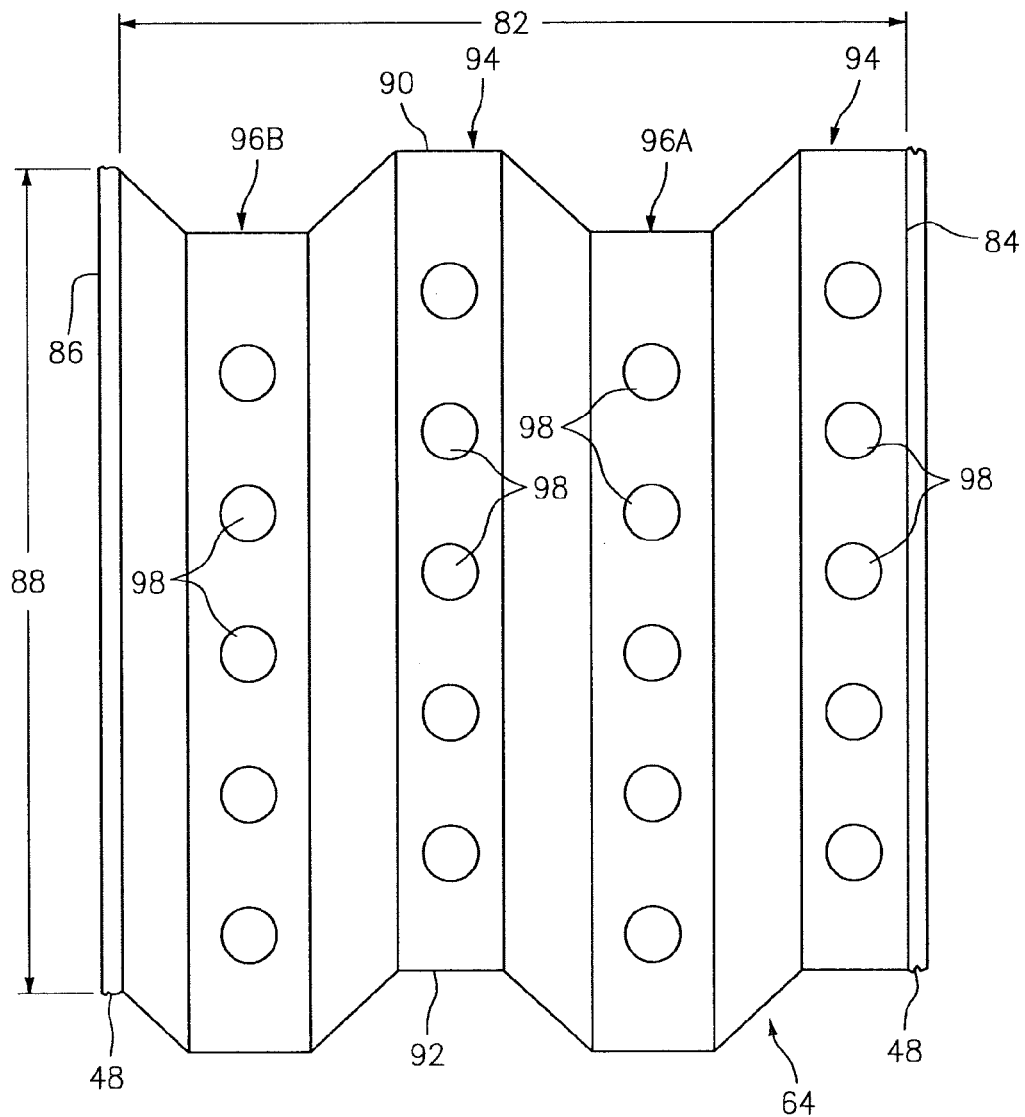
FIG. 6 is an illustration of a corrugated septum.

Referring to FIG. 6, the septum 64 has a width 82 extending between opposing lateral sides 84 and 86, which are connected to or otherwise engaged with respective walls 48. The septum 64 has a length 88 extending vertically and longitudinally between opposing top and bottom ends 90 and 92; see also FIG. 8. Note, the terms "top" and "bottom" are used above to describe ends of the septum 64 as situated in the drawings and are not intended to limit the septum 64 or the acoustic panel 20 to such an exemplary gravitational orientation.

The septum 64 is configured as a corrugated panel, which provides the septum 64 with increased rigidity and stiffness compared to a flat planar panel. The septum 64 of FIG. 5, in particular, includes a longitudinal array of septum ribs 94 and a longitudinal array of septum groove portions 96. Each of the septum ribs 94 extends vertically and longitudinally between the top and the bottom ends 90 and 92 and, thus, along the entire length of the septum 64.

The septum groove portions 96 are longitudinally interposed with the septum ribs 94. The septum groove portions 96 include at least one intermediate septum groove portion 96A. The septum groove portions 96 of FIG. 6 also include at least one end septum groove portion 96B. The intermediate septum groove portion 96A is formed by and disposed laterally between a laterally adjacent pair of the septum ribs 94. The intermediate septum groove portion 96A therefore is a formed by a trough between peaks of the septum ribs 94. The end septum groove portion 96B is formed by and disposed laterally between a respective one of the septum ribs 94 and an adjacent one of the walls 48.

Figure 7:
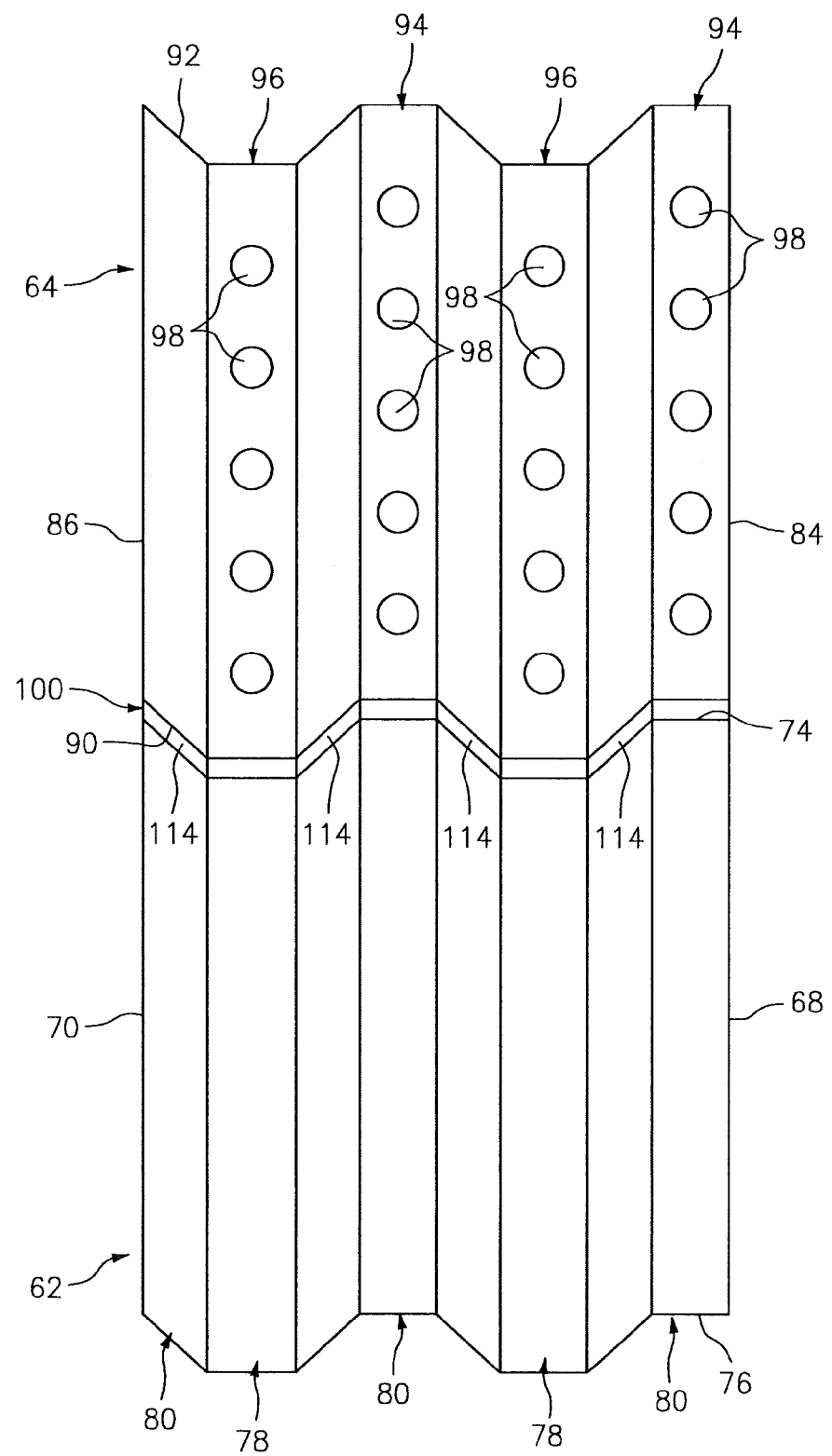
FIG. 7 is an illustration of the baffle and the septum connected at an interface with an undulating geometry.

Referring to FIG. 7, the septum ribs 94 are arranged with the septum 64 so as to be laterally offset from the baffle ribs 78 of the baffle 62; see also FIG. 3. More particularly, the septum ribs 94 are arranged with the septum 64 so as to be laterally aligned with the baffle groove portions 80 of the baffle 62. In this manner, the septum rib 94 is disposed laterally between the baffle ribs 78.

Referring again to FIG. 6, the septum 64 includes a plurality of perforations 98; e.g., through holes. At least some of these perforations 98 may be arranged in the septum ribs 94. At least some of the perforations 98 may also or alternatively be arranged in the septum groove portions 96.

Figure 8:
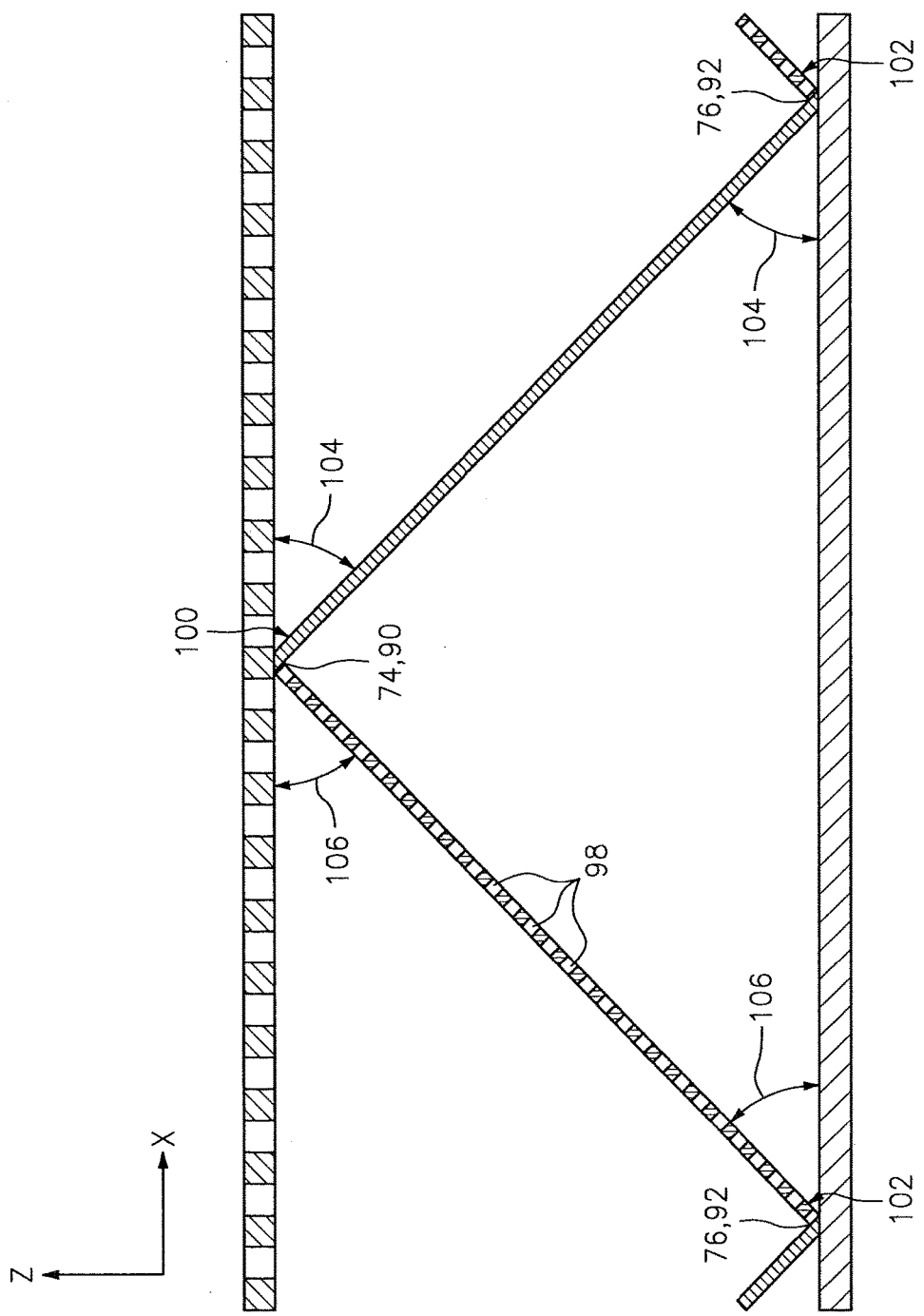
FIG. 8 is a sectional illustration of another portion of the acoustic panel taken in the x-z plane.

Referring to FIG. 8, the top end 74 of the baffle 62 is connected to or otherwise engaged with the first skin 22. This top end 74 is also longitudinally connected to the top end 90 of the septum 64 at an interface 100 between the baffle 62 and the septum 64. The bottom end 76 of the baffle 62 is connected to or otherwise engaged with the second skin 24. This bottom end 76 is also longitudinally connected to the bottom end 92 of a septum 64 of an adjacent one of the corrugations 52 at an interface 102. With the foregoing configuration, the baffle 62 extends vertically between the first skin 22 and the second skin 24 and longitudinally between the septums 64. The baffle 62 is therefore angularly offset from the first skin 22 and the second skin 24 by an included angle 104. This angle 104 is an acute angle such as, but not limited to, about forty-five degrees (45°).

Figure 12:
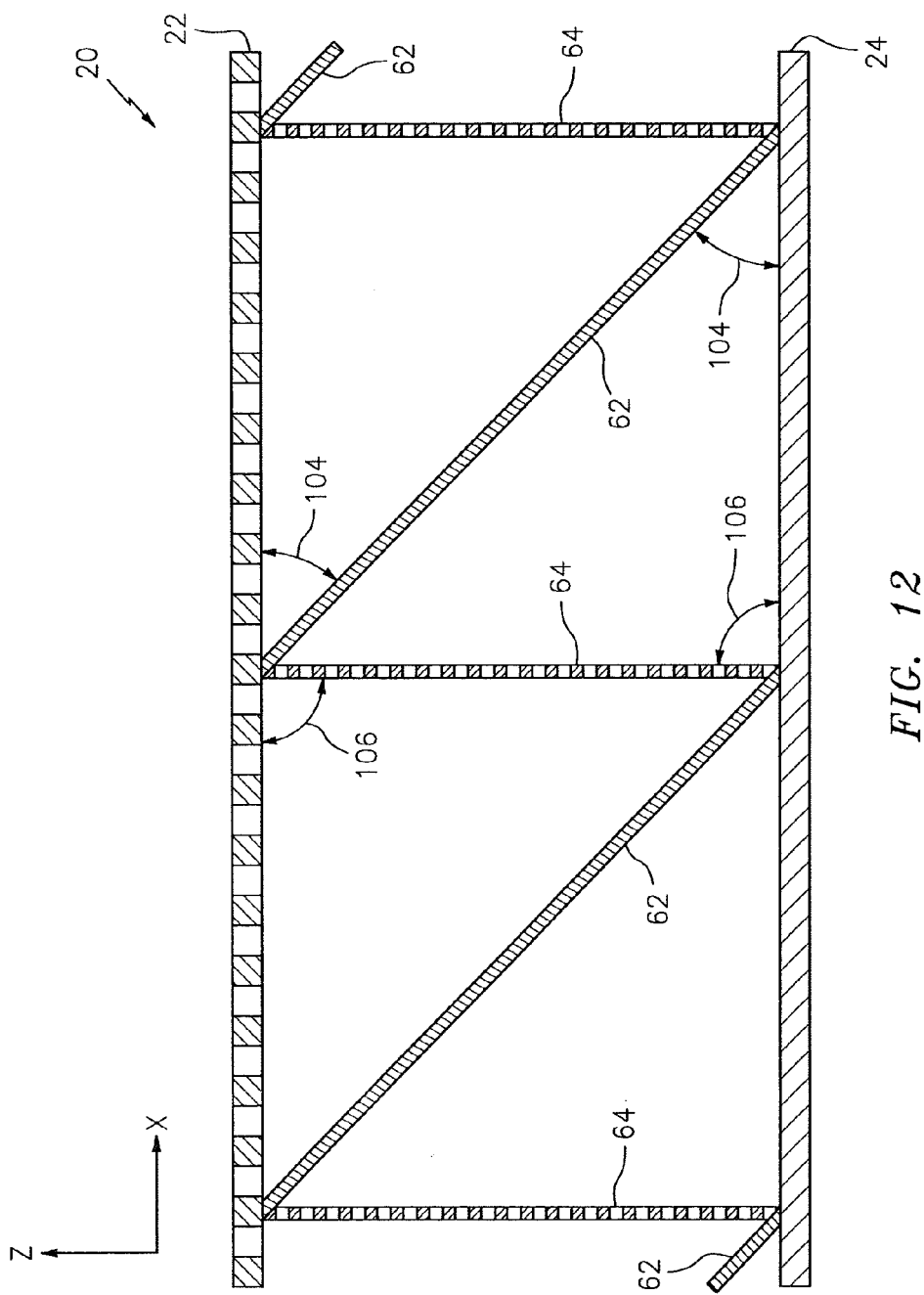
FIG. 12 is a sectional illustration of a portion of another acoustic panel taken in the x-z plane.

The top end 90 of the septum 64 is connected to or otherwise engaged with the first skin 22. This top end 90 is also longitudinally connected to the top end 74 of the baffle 62 as described above. The bottom end 92 of the septum 64 is connected to or otherwise engaged with the second skin 24. This bottom end 92 is also longitudinally connected to the bottom end 76 of a baffle 62 of an adjacent one of the corrugations 52 at an interface; e.g., the interface 102. With the foregoing configuration, the septum 64 extends vertically between the first skin 22 and the second skin 24 and longitudinally between the baffles 62. The septum 64 is therefore angularly offset from the first skin 22 and the second skin 24 by an included angle 106. This angle 106 may be an acute angle such as, but not limited to, about forty-five degrees (45°). The angle 106 may be substantially equal to the angle 104 as shown in FIG. 8. Alternatively, the angle 106 may be different from the angle 104; e.g., a larger or smaller acute angle, or a right angle. For example, the angle 106 may be about 90 degrees and the angle 104 may be about 45 degrees as shown in FIG. 12. Alternatively, the angle 104 may be 90 degrees and angle 106 may be about 45 degrees depending on the acoustic and structural design requirements.

Figure 9:
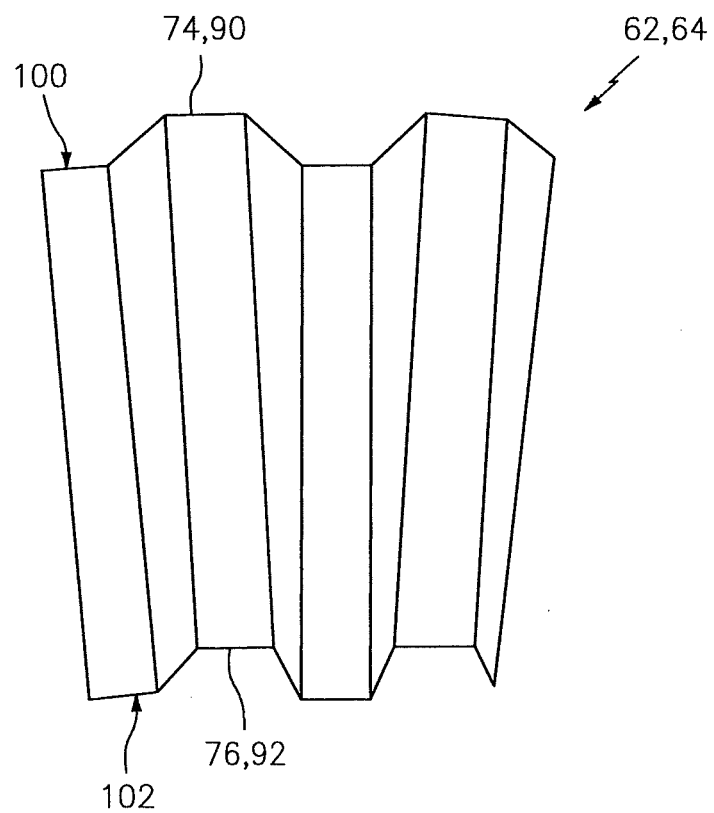
FIGS. 9 and 10 are representational illustrations of a component such as the baffle or the septum bending about an axis.
Figure 9:
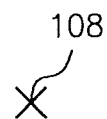
Figure 10:
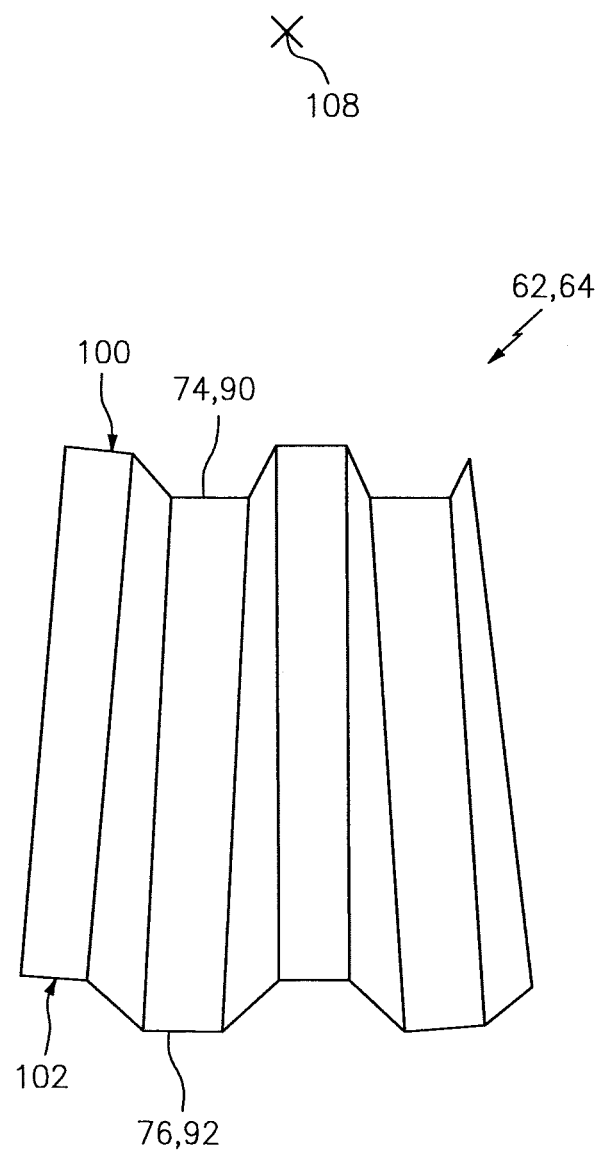
Figure 11:
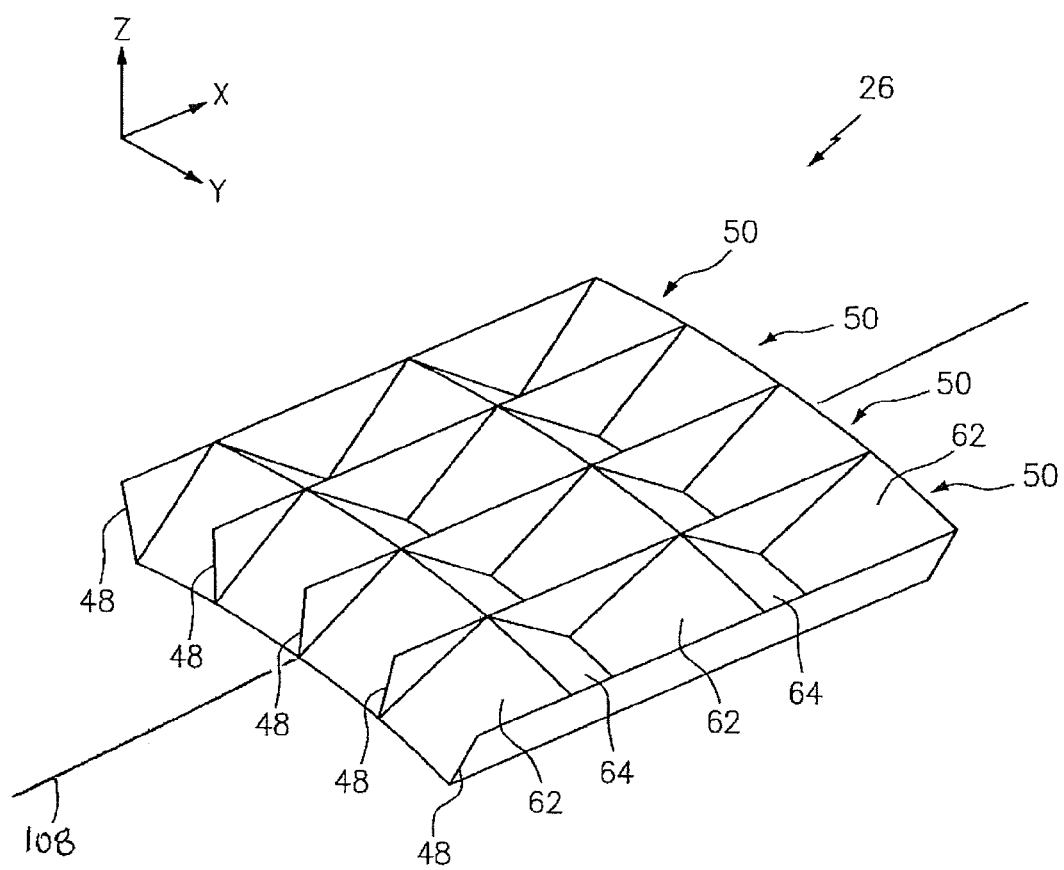
FIG. 11 is a representational illustrations of the structural, acoustic panel bent about an axis.

Referring to FIGS. 7 and 8, due to the arrangement of the baffle ribs 78 and the septum ribs 94, the interfaces 100 and 102 between the baffles 62 and the septums 64 may each have an undulating geometry (see FIG. 7). This undulating geometry along with the corrugated configurations of the baffles 62 and the septums 64 enable each of the corrugations 52 to bend about a laterally extending axis 108 as shown in FIGS. 9 and 10. For example, as shown in FIG. 9, the undulating geometries of the interfaces 100 and 102 enable the ribs at the interface 102 to move closer together (see FIG. 9) as compared to the ribs at the interface 100. In another example, as shown in FIG. 10, the undulating geometries of the interfaces 100 and 102 enable the ribs at the interface 100 to move closer together (see FIG. 10) as compared to the ribs at the interface 102. As a result, the entire cellular core 26 may be draped (see FIG. 11); e.g., bent about a longitudinally extending axis 108.

In addition to the foregoing, the undulating geometries of the interfaces 100 and 102 may increase the structural rigidity of the core 26 in the vertical direction. For example, in order to compress one of the corrugations 52 radially (e.g., move the skins towards one another), the interfaces 100 and 102 would likely first need to deform so as to laterally straighten out. Furthermore, such lateral deformation would likely result in the flattening of the baffle 62 and septum 64 and, thus, increasing the lateral widths of the baffle 62 and septum 64 at least at the interfaces 100 and 102. The walls 48 on either side of the corrugation 52 therefore may prohibit or reduce the ability of the corrugation 52 to deform laterally.

Referring to FIG. 2, each of the cavities 54 extends longitudinally between and is formed by a longitudinally adjacent pair of the baffles 62. Each septum 64 is disposed within and divides a respective one of the cavities 54 into fluidly coupled sub-cavities 54A and 54B. More particularly, the perforations 98 in the septum 64 fluidly couple the sub-cavities 54A and 54B together.

Each of the cavities 54 forms a resonance chamber 110. A length 112 of the resonance chamber 110 extends diagonally between the first skin 22 and the second skin 24 and through a respective one of the septums 64. The length 112 of the resonance chamber 110 therefore is longer than the vertical thickness 42 of the cellular core 26. This enables noise attenuation of relatively low frequency noise without increasing the vertical thickness 42 of the core 26 and, thus, a vertical thickness of the acoustic panel 20. For example, each resonance chamber 110 may receive noise waves through the perforations 34 in the first skin 22. The resonance chamber 110 may reverse the phase of one or more frequencies of those sound waves using known acoustic reflection principles and subsequently direct the reverse phase sound waves out of the acoustic panel 20 through the perforations 34 to destructively interfere with other incoming noise waves.

The cellular core 26 may be constructed from any suitable material(s). The cellular core 26, for example, may be constructed from a metal, a polymer, a fiber reinforced composite (e.g., fiberglass composite, carbon fiber composite, aramid fiber composite, fiber reinforced plastic (FRP), metal matrix material, using continuous fibers, chopped fiber, particulates infused (e.g., nano tubes, etc.), paper such as that in a nomex core, etc.), or a combination thereof. One or more of components of the cellular core 26 may be constructed from the same or a like material. Alternatively, one or more of the components of the cellular core 26 may be constructed from a different material than one or more of the other components of the cellular core 26. Furthermore, the cellular core 26 may be constructed from the same material(s) as the first skin 22 and/or the second skin 24, or a different material or materials.

Referring to FIGS. 5 and 6, in some embodiments, one or more of the baffle ribs 78 may each have a trapezoidal cross-sectional geometry formed by a peak 78A of the rib 78 and its two adjacent sides 78B. In addition or alternatively, one or more of the septum ribs 94 may each have a trapezoidal cross-sectional geometry formed by a peak 94A of the rib 94 and its two adjacent sides 94B. However, in other embodiments, one or more of the baffle ribs 78 and/or one or more of the septum ribs 94 may have an alternative shaped cross-sectional geometry (e.g., square, rectangular, etc.) depending on how the material is bent/formed to form the ribs 78, 94.

Referring to FIG. 7, in some embodiments, one or more apertures 114 (e.g., through holes) may extend through the interface 100 (and 102) between the baffle 62 and the septum 64. These apertures 114 may be placed between the peaks of the ribs 78 and 94 and the peaks of the groove portions 80 and 96. Such aperture 114 may enable the corrugations 52 to be constructed from a sheet of material such as sheet metal. However, the present disclosure is not limited to such a construction technique or corrugation configuration.

Figure 13:
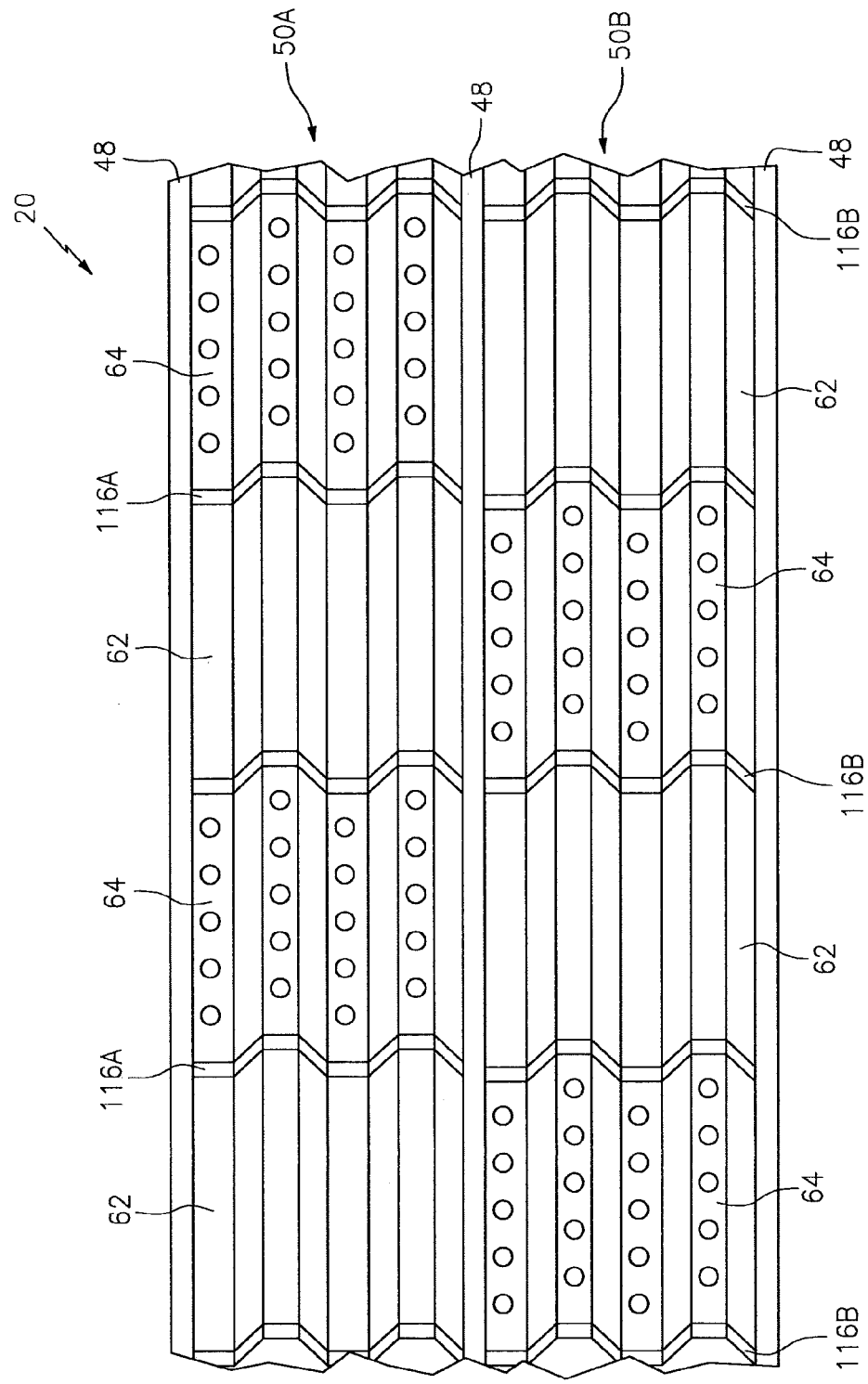
FIG. 13 is an illustration of a portion of another cellular core for the acoustic panel.

In some embodiments, referring to FIG. 13, the corrugations 52 in laterally adjacent arrays 50 may be longitudinally offset. For example, the peaks 116A of the corrugations 52 in one of the arrays 50A may be longitudinally between the peaks 116B of the corrugations 52 in an adjacent one of the arrays 50B.

Figure 14:
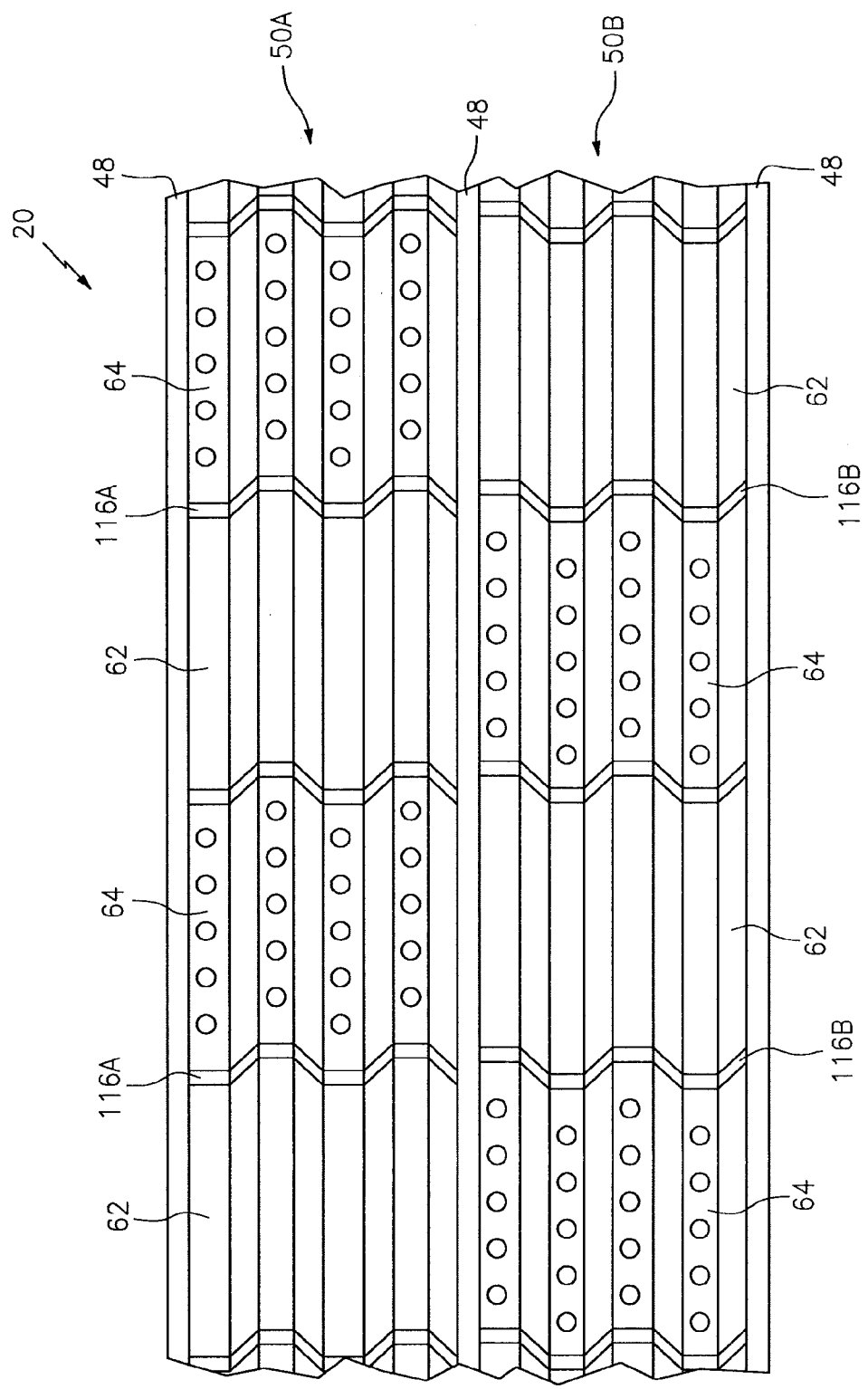
FIG. 14 is an illustration of a portion of still another cellular core for the acoustic panel.

In some embodiments, referring to FIG. 14, the placement of the septums 64 and baffles 62 in the corrugations 52 in one of the arrays 50A may be different of the placement of the septums 64 and baffles 62 in the corrugations 52 in another one of the arrays 50B. For example, the septums 64 may be on the left side of the corrugations 52 (see FIG. 3) in the array 50B, whereas the septums 64 may be one the right side of the corrugations in another (e.g., laterally adjacent) one of the arrays 50A. In such a configuration, the orientation of the arrays 50A and 50B of corrugations 52 alternate with one another. In some embodiments, the corrugations 52 in laterally adjacent arrays 50 may also be longitudinally offset in a similar manner or otherwise as described above with respect to FIG. 13.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

I claim:

1. A panel for attenuating noise, comprising:
a perforated first skin;
a second skin; and
a core forming a plurality of cavities vertically between the first skin and the second skin, the core including an array of corrugations that include a first baffle, a second baffle and a first septum;
the cavities including a first cavity that is formed longitudinally between the first baffle and the second baffle and is fluidly coupled with perforations in the first skin; and
the first septum extending from the first skin and the first baffle to the second skin and the second baffle, and dividing the first cavity into fluidly coupled sub-cavities;
wherein the first baffle includes a lateral array of baffle ribs, and the first septum includes a lateral array of septum ribs that are laterally offset from the baffle ribs.

2. The panel of claim 1, wherein a first of the septum ribs is disposed laterally between a laterally adjacent pair of the baffle ribs.

3. The panel of claim 1, wherein a first of the septum ribs is laterally aligned with a groove portion formed in the first baffle between a laterally adjacent pair of the baffle ribs.

4. The panel of claim 1, wherein
the baffle ribs and the septum ribs extend to an interface between the first baffle and the first septum thereby providing the interface with an undulating geometry; and
the first baffle and the first septum are connected to the first skin at the interface.

5. The panel of claim 4, wherein the interface includes a plurality of apertures respectively between adjacent peaks of the undulating geometry.

6. The panel of claim 1, wherein the corrugations are configured to enable draping of the core about a laterally extending axis.

7. The panel of claim 1, wherein
the baffle ribs extend along an entire length of the first baffle between the first skin and the second skin; and
the septum ribs extend along an entire length of the first septum between the first skin and the second skin.

8. The panel of claim 1, wherein the first septum includes a plurality of perforations in the septum ribs.

9. The panel of claim 1, wherein
the first septum includes a plurality of groove portions, each of the groove portions formed between a respective laterally adjacent pair of the septum ribs; and
the first septum includes a plurality of perforations in the groove portions.

10. The panel of claim 1, wherein the first baffle and the first septum have corrugated configurations.

11. The panel of claim 1, wherein
each of the baffle ribs has a trapezoidal cross-sectional geometry; and
each of the septum ribs has a trapezoidal cross-sectional geometry.

12. The panel of claim 1, wherein
the first baffle is offset from the first skin by an acute first angle; and
the first septum is offset from the first skin by a second angle.

13. The panel of claim 12, wherein the second angle is substantially equal to the first angle.

14. The panel of claim 12, wherein the second angle is different from the first angle.

15. The panel of claim 1, wherein the panel is configured as a component of an aircraft propulsion system.

16. The panel of claim 1, wherein the array of corrugations is a first array of corrugations, the core further includes a second array of corrugations, and peaks of the first array of corrugations are longitudinally offset from peaks of the second array of corrugations.

17. The panel of claim 1, wherein the array of corrugations is a first array of corrugations, the core further includes a second array of corrugations, and orientations of the first array of corrugations and the second array of corrugations alternate with one another.

18. A panel for attenuating noise, comprising:
a perforated first skin;
a second skin; and
a core forming a plurality of cavities vertically between the first skin and the second skin, the core including an array of corrugations that include a first baffle, a second baffle and a first septum;
the cavities including a first cavity that is formed longitudinally between the first baffle and the second baffle and is fluidly coupled with perforations in the first skin; and
the first septum extending from the first skin and the first baffle to the second skin and the second baffle, and dividing the first cavity into fluidly coupled sub-cavities;
wherein the first baffle includes a lateral array of baffle ribs that extend along an entire length of the first baffle between the first skin and the second skin; and
wherein the first septum includes a lateral array of septum ribs that extend along an entire length of the first septum between the first skin and the second skin.

19. A panel for attenuating noise, comprising:
a perforated first skin;
a second skin;
a core forming a plurality of cavities vertically between the first skin and the second skin, the core including a plurality of baffles and a plurality of septums respectively interposed between the baffles thereby forming an array of corrugations, the baffles including a first baffle and a second baffle, and the septums including a first septum;
the cavities including a first cavity formed longitudinally between the first baffle and the second baffle, wherein the first septum longitudinally divides the first cavity into fluidly coupled sub-cavities; and
a first end of the first septum connected to the first skin and the first baffle, and a second end of the first septum connected to the second skin and the second baffle;

wherein each of the baffles includes a lateral array of baffle ribs, and each of the septums includes a lateral array of septum ribs; and wherein the baffle ribs are configured with the baffles and the septum ribs are configured with the septums to enable draping of the core about a laterally longitudinally extending axis.

20. The panel of claim 1, wherein the baffle ribs project out from the first baffle towards the first skin, and the septum ribs project out from the first septum towards the first skin.

* * * * *

UNITED STATES PATENT AND TRADEMARK OFFICE
CERTIFICATE OF CORRECTION

Page 1 of 1

PATENT NO. : 9,704,467 B1
APPLICATION NO. : 15/130398
DATED : July 11, 2017
INVENTOR(S) : Sreenivas Narayanan Nampy It is certified that error appears in the above-identified patent and that said Letters Patent is hereby corrected as shown below:

In the Claims

Column 11, Line 5, please delete "laterally"

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*